US010766470B2

United States Patent
Yukoku et al.

(10) Patent No.: US 10,766,470 B2
(45) Date of Patent: Sep. 8, 2020

(54) BRAKE CONTROL DEVICE FOR VEHICLES

(71) Applicant: ADVICS CO., LTD., Kariya-shi, Aichi-ken (JP)

(72) Inventors: Shinichiro Yukoku, Seto (JP); Takahisa Hishikawa, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 107 days.

(21) Appl. No.: 16/304,958

(22) PCT Filed: May 26, 2017

(86) PCT No.: PCT/JP2017/019795
§ 371 (c)(1),
(2) Date: Nov. 27, 2018

(87) PCT Pub. No.: WO2017/204350
PCT Pub. Date: Nov. 30, 2017

(65) Prior Publication Data
US 2020/0164845 A1    May 28, 2020

(30) Foreign Application Priority Data
May 27, 2016  (JP) .................................. 2016-106057

(51) Int. Cl.
*B60T 8/30* (2006.01)

(52) U.S. Cl.
CPC ...................................... *B60T 8/30* (2013.01)

(58) Field of Classification Search
CPC ... B60T 8/00; B60T 8/30; B60T 8/261; B60T 8/3225; B60T 8/1706; B60T 8/17616
(Continued)

(56) References Cited

U.S. PATENT DOCUMENTS

| | | | | |
|---|---|---|---|---|
| 6,317,675 B1 * | 11/2001 | Stolzl | ..................... | B60T 7/042 303/155 |
| 6,460,941 B1 * | 10/2002 | Zenzen | ................. | B60T 8/1764 303/122 |
| 2002/0180266 A1 * | 12/2002 | Hara | ....................... | B60K 6/44 303/152 |

FOREIGN PATENT DOCUMENTS

JP    2011156983 A    8/2011

OTHER PUBLICATIONS

International Search Report (PCT/ISA/210) dated Aug. 22, 2017, by the Japanese Patent Office as the International Searching Authority for International Application No. PCT/JP2017/019795.

* cited by examiner

*Primary Examiner* — Robert A. Siconolfi
*Assistant Examiner* — San M Aung
(74) *Attorney, Agent, or Firm* — Buchanan Ingersoll & Roooney PC (57) ABSTRACT

This brake control device includes: an operation amount sensor which detects the brake operating member operation amount; front-wheel and rear-wheel actuators which generate braking force in front/rear wheels; front-wheel and rear-wheel sensors which detect the outputs of the front-wheel and rear-wheel actuators; and a controller which controls the front-wheel and rear-wheel actuators based on the operation amount and the outputs of the front and rear wheels. On the basis of the operation amount and/or the output of the rear wheels, the controller determines whether or not a long-term low-load state in which the friction member is continuously pressed against the rotary members of the rear wheels within a predetermined range over a long period of time is established. If so, the distribution ratio of the rear-wheel braking force to the total applied braking (Continued)

force is decreased compared to when a long-term low-load state is not determined to be established.

2 Claims, 6 Drawing Sheets

(58) Field of Classification Search
USPC .................. 303/155, 122.12, 122.03, 169
See application file for complete search history.

BRAKE CONTROL DEVICE FOR VEHICLES

TECHNICAL FIELD

The present invention relates to a brake control device for a vehicle.

BACKGROUND ART

In Patent Literature 1, "braking force distribution control in which distribution of a braking force is changed in response to a request for braking performance under a high braking load without enlarging a braking device of a vehicle" is described. More specifically, it is described that "determination means for determining whether a high braking load state is established on the basis of intervals and the number of executions of braking execution processing and distribution control means for changing front and rear wheel braking force distribution of the vehicle when it is determined that the high braking load state is established are provided, the high braking load state is detected in the cases where the braking execution processing of requesting the braking force that exceeds a specified braking force and driving execution processing of requesting a driving force that exceeds a specified driving force are alternately executed and where the braking execution processing is executed for the number of times that exceeds the specified number of times at a shorter braking execution interval than a specified period of time, and the front and rear wheel braking force distribution is changed by decreasing the braking force on front wheels and increasing the braking force on rear wheels".

The brake control device described in the Patent Literature 1 is based on the following idea; "it is considered that the braking device on the rear wheel side has room for heat capacity when compared to that on the front wheel side. Accordingly, in the case where the braking load is higher than that in normal use environment, the braking force distribution control is temporarily executed such that the rear-wheel braking device compensates for shortage of braking capacity or the braking performance of the front-wheel braking device. In this way, the braking performance or the braking capacity that is requested under the high braking load can be realized without enlarging the braking devices". Accordingly, the brake control device in the Patent Literature 1 specifically controls such that "when it is determined that the braking load is increased due to a travel pattern in which rapid acceleration and rapid deceleration are repeated, the front and rear wheel braking force distribution is initially changed to be biased toward the rear-wheel side in order to decrease the braking load of the front-wheel braking device that is actuated to generate the relatively large braking force and to prevent the front-wheel braking device from being brought into an overheated state, and, when a decrease of the braking load by such a change in the distribution is insufficient, a gear stage of a transmission is thereafter lowered, so as to suppress an increase of the load of the braking device".

In regard to the brake control device, from a perspective of heating, it is necessary to consider not only the travel pattern in which the rapid acceleration and the rapid deceleration are repeated but also situations where various braking operations are performed. That is, of the various braking operation situations, there is a situation where requested performance for the front-wheel and rear-wheel braking devices contradict each other. More specifically, there is a case where the large braking force is generated in a short period of time by rapid braking from high-speed travel, and there is a case where the relatively small braking force is generated over a long period of time on a downhill road or the like. In the short intense braking operation, the relatively high heat capacity is requested for the front-wheel braking device. Meanwhile, in the long mild braking operation, the relatively high heat capacity is requested for the rear-wheel braking device. The heat capacity of the braking device can be increased by thickening a brake disc, enlarging a brake caliper, and the like. However, any of such changes is not preferred from a perspective of reductions in size and weight of the device.

CITATION LIST

Patent Literature

Patent Literature 1: JP-A-2011-156983

SUMMARY OF INVENTION

Technical Problem

The present invention has a purpose of providing a braking device, overall size of which can be reduced, by setting appropriate specifications of braking members (a brake caliper, a brake disc, and the like) around each wheel in terms of heat in consideration of various braking operation situations in a brake control device capable of at least independently controlling braking forces of front wheels and rear wheels of a vehicle.

Solution to Problem

A brake control device for a vehicle according to the present invention includes: an operation amount sensor that detects an operation amount of a brake operating member of a vehicle; a front-wheel actuator that presses a friction member against a front-wheel rotary member integrally rotating with a front wheel of the vehicle and thereby generates a front-wheel braking force in said front wheel; a rear-wheel actuator that presses a friction member against a rear-wheel rotary member integrally rotating with a rear wheel of the vehicle and thereby generates a rear-wheel braking force in said rear wheel; a front-wheel sensor that detects front-wheel output of the front-wheel actuator; a rear-wheel sensor that detects rear-wheel output of the rear-wheel actuator; and a controller that controls the front-wheel actuator and the rear-wheel actuator on the basis of the operation amount, the front-wheel output, and the rear-wheel output.

In the brake control device for the vehicle according to the present invention, the controller is configured to: determine whether a long-term low-load state where the friction member is continuously pressed against the rear-wheel rotary member over a long period of time in a state within a specified range is established on the basis of the operation amount and/or the rear-wheel output; and in the case where it is determined that the long-term low-load state is established, decrease a distribution ratio of the rear-wheel braking force to a total braking force applied to the vehicle in comparison with the case where it is not determined that the long-term low-load state is established.

In addition, in the brake control device for the vehicle according to the present invention, the controller is configured to: calculate occurrence frequency of the state within the specified range; and decrease the distribution ratio on the basis of the occurrence frequency.

According to the above configuration, in the case where a large braking force is applied in a short period of time during rapid braking from high-speed travel (in a short-term high-load braking state), a ratio (a rear-wheel braking force distribution ratio) hbo of the rear-wheel braking force Fbr* to the predetermined total braking force (Fbf*+Fbr*) is adopted. For example, as the initial value hbo, a characteristic that approximates so-called theoretical braking force distribution can be adopted.

Furthermore, on the basis of the braking operation amount Bpa and/or the rear-wheel output (for example, a hydraulic pressure of a rear wheel cylinder) Pcr*, it is determined whether the long-term low-load state where the friction member MSB is continuously pressed against the rear-wheel rotary member KTr* over the long period of time in the state within the specified range sfh is established. In the case where it is not determined that the long-term low-load state is established, the initial value hbo is adopted. On the other hand, in the case where it is determined that the long-term low-load state is established (that is, in the case where a relatively small braking force is continuously generated over the long period of time on a downhill road or the like), the ratio Hbn is corrected to be decreased from the initial value hbo. Due to a decrease of the ratio Hbn, the front-wheel braking force Fbf* is increased while the rear-wheel braking force Fbr* is decreased.

In a relatively mild braking operation over the long period of time (the long-term low-load braking state), relatively high heat capacity is requested for a rear-wheel braking device. In the brake control device according to the present invention, the rear-wheel braking force Fbr* is decreased, and the braking force Fbf* that is generated by a front-wheel braking device having room for the heat capacity is increased. Accordingly, in any of various braking operations, the heat capacity of each of the front-wheel and rear-wheel braking devices is appropriately regulated by braking force distribution control. Thus, reductions in size and weight of the brake control device as a whole can be achieved.

In addition, in the short-term high-load braking state, the predetermined front-rear braking force distribution ratio (the initial ratio) hbo is always adopted. Thus, stability of the vehicle is secured. The long-term low-load braking state is likely to occur in a situation where the vehicle slowly travels on the downhill road from a location at high altitudes. In this situation, center of gravity of the vehicle is slightly shifted to the front wheel side. Accordingly, the ratio Hbn of the rear-wheel braking force to the total braking force of the vehicle is corrected to be decreased. Thus, the rear-wheel braking force Fbr* is decreased while the front-wheel braking force Fbf* is increased. Therefore, braking force distribution that corresponds to a dynamic fluctuation of a wheel load caused by a slope road gradient can be achieved.

Furthermore, on a winding road (particularly, at a hairpin curve) on a downhill gradient, the stability of the vehicle is requested. In such a travel state, the rear-wheel distribution ratio Hbn is corrected to be decreased. Thus, a rear-wheel lateral force is secured. As a result, the stability of the vehicle can be improved.

DESCRIPTION OF EMBODIMENTS

Reference Signs of Components and the Like and Additional Characters at End of Reference Signs A description will be made on an embodiment of a brake control device for a vehicle according to the present invention with reference to the drawings. In the following description, like an "ECU", components, calculation processing, signals, and values denoted by the same reference signs will have the same function. In addition, additional characters ("fr" and the like) provided at the end of various reference signs are generic signs, each of which indicates a relation to a wheel. More specifically, "fr", "fl", "rr", and "rl" respectively indicate a right front wheel, a left front wheel, a right rear wheel, and a left rear wheel. For example, wheel cylinders will be described as a right-front wheel cylinder WCfr, a left-front wheel cylinder WCfl, a right-rear wheel cylinder WCrr, and a left-rear wheel cylinder WCrl.

The additional characters ("f*" and "r*") provided at the end of the various reference signs are generic signs, each of which indicates a relation to the wheels (that is, front wheels or rear wheels) in a longitudinal direction of the vehicle. More specifically, "f*" indicates the components and the like related to the front wheels, and "r*" indicates the components and the like related to the rear wheels. Thus, the additional characters "f*" are a collective term for "fr" and "fl", and the additional characters "r*" are a collective term for "rr" and "rl". For example, the right-front wheel cylinder WCfr and the left-front wheel cylinder WCfl will be described as front wheel cylinders WCf*. In addition, the right-rear wheel cylinder WCrr and the left-rear wheel cylinder WCrl will be described as rear wheel cylinders WCr*.

Embodiment of Brake Control Device According to the Present Invention

A description will be made on a vehicle that includes the embodiment of the brake control device according to the present invention with reference to an overall configuration diagram in FIG. 1. The vehicle includes a brake operating member BP, operation amount acquisition means BPA, an electronic control unit ECU, a tandem master cylinder (also simply referred to as a master cylinder) MCL, master cylinder shut-off valves VMf*, VMr* (also simply described as "VM"), a stroke simulator (also simply referred to as a simulator) SSM, a simulator shut-off valve VSM, master cylinder fluid passages HMf*, HMr* (also simply described to as "HM"), wheel cylinder fluid passages HWf*, HWr* (also simply described to as "HW"), a simulator fluid passage HSM, and pressure regulating units CAf*, CAr* (also simply described to as "CA").

Furthermore, wheels WHfr, WHfl, WHrr, WHrl (also simply described as "WH") of the vehicle respectively include brake calipers CPfr, CPfl, CPrr, CPrl (also simply referred to as calipers and also described as "CP"), the wheel cylinders WCfr, WCfl, WCrr, WCrl (also simply described as "WC"), and rotary members KTfr, KTfl, KTrr, KTrl (also simply described as "KT"). Note that, in the following description, the fluid passages (HMf* and the like) and fluid chambers (Rm1 and the like) are in a fluid-tight state.

The brake operating member (for example, a brake pedal) BP is a member operated by a driver to decelerate the vehicle. When the brake operating member BP is operated, braking torque of each of the wheels WH is regulated, and a braking force is thereby generated in each of the wheels WH. More specifically, a rotary member (for example, a brake disc) KT is fixed to each of the wheels WH of the vehicle. Each of the calipers CP is arranged in a manner to hold the rotary member KT therebetween. In addition, each of the calipers CP is provided with the wheel cylinder WC. When a pressure (a hydraulic pressure) of a braking fluid in each of the wheel cylinders WC is increased, a friction member (for example, a brake pad) MSB is pressed against the rotary member KT. Each of the rotary members KT and corresponding one of the wheels WH are fixed to each other for integral rotation. Thus, the braking torque (the braking force) is generated in each of the wheels WH by a friction force that is generated at this time.

The operation amount acquisition means (an operation amount sensor) BPA is provided in the brake operating member BP. The operation amount acquisition means BPA acquires (detects) an operation amount (a braking operation amount) Bpa of the brake operating member BP by the driver. More specifically, as the operation amount acquisition means BPA, at least one of a hydraulic pressure sensor that detects a pressure of the master cylinder MCL, an operation displacement sensor that detects operation displacement of the brake operating member BP, and an operating force sensor that detects an operating force of the brake operating member BP is adopted. That is, the operation amount acquisition means BPA is a collective term of the master cylinder hydraulic pressure sensor, the operation displacement sensor, and the operating force sensor. Accordingly, the braking operation amount Bpa is determined on the basis of at least one of the hydraulic pressure of the master cylinder MCL, the operation displacement of the brake operating member BP, and the operating force of the brake operating member BP. The electronic control unit (also referred to as a controller) ECU receives the operation amount Bpa.

On the basis of the braking operation amount Bpa, the electronic control unit (the controller) ECU controls electric motors MTf*, MTr* (also simply described as "MT") of the front-wheel and rear-wheel pressure regulation units CAf*, CAr* (corresponding to the front-wheel and rear-wheel actuators and also simply described as "CA"), the simulator shut-off valve VSM, and the master cylinder shut-off valves VMf*, VMr* (also simply described as "VM"). More specifically, a control algorithm for controlling the electric motors MT, the simulator shut-off valve VSM, and the master cylinder shut-off valves VM is programmed into a microprocessor of the controller ECU, and signals for controlling these components are calculated.

More specifically, in the case where the operation amount Bpa becomes equal to or greater than a specified value (a play corresponding value) bp0, the controller ECU outputs a drive signal Vsm used to bring the simulator shut-off valve VSM into an open position and outputs drive signals Vmf*, Vmr* (also simply described as "Vm") used to bring the master cylinder shut-off valves VM (the collective term of VMf*, VMr*) into closed positions. As a result, the master cylinder MCL is brought into a communicating state with the simulator SSM, and control cylinders SCf*, SCr* (also simply described as "SC") of the pressure regulation units CA are each brought into a communicating state with the wheel cylinders WC. Accordingly, the hydraulic pressures in the wheel cylinders WC are controlled by the pressure regulation units CA (the collective term of CAf*, CAr*).

The master cylinder MCL is mechanically connected to the brake operating member BP via a piston rod. The master cylinder MCL converts the operating force of the brake operating member BP (a brake pedal depression force) to the hydraulic pressure. The master cylinder fluid passages HMf*, HMr* (also simply described as "HM") are fluidly connected to the master cylinder MCL. When the brake operating member BP is operated, the braking fluid (a brake fluid) is discharged (pressure-fed) from the master cylinder MCL into the master cylinder fluid passages HM. Here, each of the master cylinder fluid passages HM (the collective term of HMf*, HMr*) is a fluid passage (for example, a braking pipe) that extends from the master cylinder MCL to the master cylinder shut-off valve VM.

<<Fluid Passages of Two Systems (Configurations of Front and Rear Pipes)>>

A description will be made on fluid passages of two systems with reference to a hydraulic circuit. Paths (the fluid passages), through each of which the braking fluid is transferred, between the master cylinder MCL and the four wheel cylinders WC are constructed of two systems. One of the systems is a "front-wheel system", and a first master cylinder chamber (also referred to as a first pressurizing chamber) Rm1 of the master cylinder MCL is fluidly connected to the front wheel cylinders WCf* (the collective term of WCfr, WCfl). The other system is a "rear-wheel system", and a second master cylinder chamber (also referred to as a second pressurizing chamber) Rm2 of the master cylinder MCL is fluidly connected to the rear wheel cylinders WCr* (the collective term of WCrr, WCrl). As the hydraulic circuit, configurations of so-called front and rear pipes are adopted. The configuration related to the front wheels and the configuration related to the rear wheels are basically the same. Thus, a description will now be made on a configuration of a fluid passage Hf* related to the front wheels.

The pressure regulating unit (also referred to as a pressure regulation unit) CAf* for the front wheels is provided in the front-wheel fluid passage Hf* that connects the first pressurizing chamber Rm1 of the master cylinder MCL and the front wheel cylinders WCf*. That is, the pressure regulation unit CAf* is provided in an intermediate portion of the front-wheel fluid passage Hf*. Here, a portion of the front-wheel fluid passage Hf* from the first pressurizing chamber Rm1 to the front-wheel master cylinder shut-off valve VMf* is the front-wheel master cylinder fluid passage HMf*, and a portion of the front-wheel fluid passage Hf* from the front-wheel master cylinder shut-off valve VMf* to each of the wheel cylinders WCf* is the front wheel cylinder fluid passage HWf*.

The front-wheel pressure regulation unit CAf* (corresponding to the front-wheel actuator) is configured to include the front-wheel control cylinder SCf* and the front-wheel electric motor MTf*. In the case where the driver performs a braking operation, and in the case where automatic pressurization is required, the fluid connection between the master cylinder MCL and the wheel cylinders WCf* is shut off (brought into a non-communicating state) by the front-wheel master cylinder shut-off valve VMf*. Then, the pressure regulation unit CAf* regulates (increases, keeps, or decreases) the hydraulic pressure of each of the wheel cylinders WCf*. A front-wheel control hydraulic pressure sensor PCf* acquires (detects) a hydraulic pressure (an actual control hydraulic pressure) Pcf* that is regulated by the front-wheel pressure regulation unit CAf*.

The front-wheel fluid passage Hf* is formed of the master cylinder fluid passage (the braking pipe) HMf* from the master cylinder MCL to the master cylinder shut-off valve VMf* and the wheel cylinder fluid passage (the braking pipe) HWf* from the master cylinder shut-off valve VMf* to each of the wheel cylinders WCf*. A master cylinder hydraulic pressure sensor PM1 is provided in the master cylinder fluid passage HMf* so as to detect a hydraulic pressure (a master cylinder hydraulic pressure) Pm1 of the pressurizing chamber Rm1.

A front-wheel hydraulic unit HUf* is provided in an intermediate portion of the front wheel cylinder fluid passage HWf*. Furthermore, the wheel cylinder fluid passage HWf* is provided with the control hydraulic pressure sensor PCf* for the front wheels between the pressure regulation unit CAf* and the hydraulic unit HUf* so as to detect the control hydraulic pressure Pcf* of the pressure regulation unit CAf* (particularly, in the control cylinder SCf*).

The hydraulic unit (also referred to as a modulator) HUf* for the front wheels is configured to include a booster valve and a reduction valve, and separately and independently controls the hydraulic pressures of the front wheel cylinders WCf* when executing wheel slip control such as anti-skid control or vehicle stabilization control.

The stroke simulator (also simply referred to as the simulator) SSM is provided to generate the operating force in the brake operating member BR. The simulator shut-off valve (also simply referred to as a shut-off valve) VSM is provided between the pressurizing chamber Rm1 in the master cylinder MCL and the simulator SSM. The shut-off valve VSM is a two-position electromagnetic valve that has an open position and a closed position. In the case where the shut-off valve VSM is at the open position, the master cylinder MCL and the simulator SSM are brought into the communicating state. In the case where the shut-off valve VSM is at the closed position, the master cylinder MCL and the simulator SSM are brought into a shut-off state (a non-communicating state). The shut-off valve VSM is controlled by the drive signal Vsm from the controller ECU. As the shut-off valve VSM, a normally-closed electromagnetic valve (an NC valve) can be adopted.

A piston and an elastic body (for example, a compression spring) are provided in the simulator SSM. Thus, in the case where the brake operating member BP is operated, the braking fluid is transferred from the master cylinder MCL (the pressurizing chamber Rm1) to the simulator SSM, and the piston is pressed by the inflow braking fluid. The elastic body applies a force to the piston in a direction to inhibit the inflow of the braking fluid. This elastic body generates the operating force (for example, the brake pedal depression amount) in the case where the brake operating member BP is operated.

Next, a brief description will be made on a configuration related to a rear-wheel fluid passage Hr*. As described above, the configuration related to the front-wheel fluid passage Hf* and the configuration related to the rear-wheel fluid passage Hr* are basically the same. Thus, "Rm1", "WHf*", "HMf*", "HWf*", "HUf*", "CAf* (the front-wheel actuator)", and "PCf* (the front-wheel sensor)" respectively correspond to "Rm2", "WHr*", "HMr*", "HWr*", "HUr*", "CAr* (the rear-wheel actuator)", and "PCr* (a rear-wheel sensor)". That is, in the description of the components related to the fluid passage Hf* for the front wheels, "front-wheel" and the additional characters "f*" provided at the end of the reference signs are respectively replaced with "rear-wheel" and "r*", and such a description corresponds to the description of the components related to the fluid passage Hr* for the rear wheels. Note that, in the configuration related to the rear-wheel fluid passage Hr*, the simulator and the master cylinder hydraulic pressure sensor are not provided. However, similar to the front-wheel fluid passage Hf*, these may be provided in the rear-wheel fluid passage Hr*. The description has been made so far on the fluid circuit.

The brake caliper (also simply referred to as the caliper) CP is provided in each of the wheels WH, applies the braking torque to each of the wheels WH, and generates the braking force. As the calipers CP, floating calipers can be adopted. Each of the calipers CP is configured to hold the rotary member (for example, the brake disc) KT therebetween via the two friction members (for example, the brake pads) MSB. The wheel cylinder WC is provided in each of the calipers CP. When the hydraulic pressure in each of the wheel cylinders WC is regulated, the piston in the wheel cylinder WC moves (advances or retreats) with respect to the rotary member KT. Due to this movement of the piston, the friction members MSB are pressed against the rotary member KT, and the friction force is thereby generated.

Figure 1:
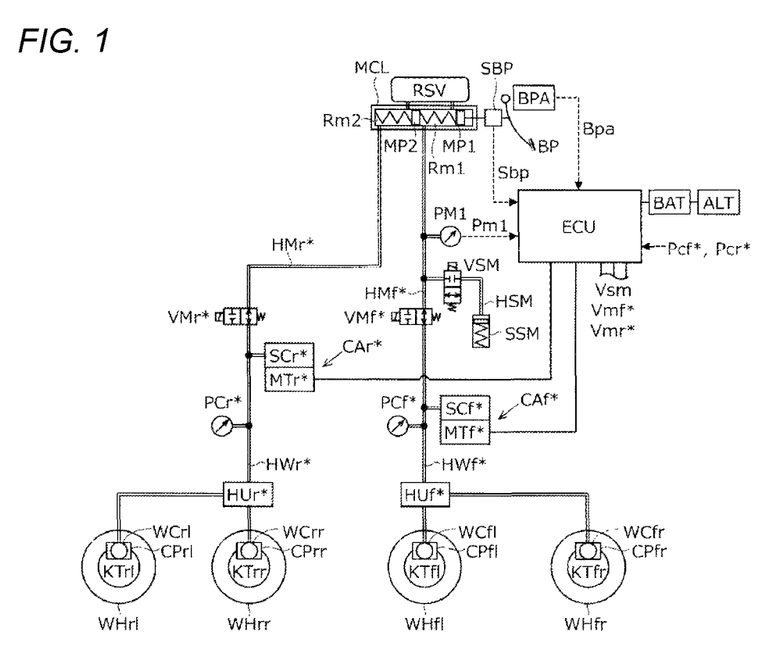
FIG. 1 is an overall configuration diagram of an embodiment of a brake control device according to the present invention.

In FIG. 1, a configuration of a disc braking device (a disc brake) is exemplified. In this case, the friction member MSB is the brake pad, and the rotary member KT is the brake disc. Instead of the disc braking device, a drum braking device (a drum brake) can be adopted. In the case of the drum brake, a brake drum is adopted instead of the caliper CP. In addition, the friction member MSB is a brake shoe, and the rotary member KT is the brake drum.

<Pressure Regulation Unit (Actuator) CA>

Figure 2:
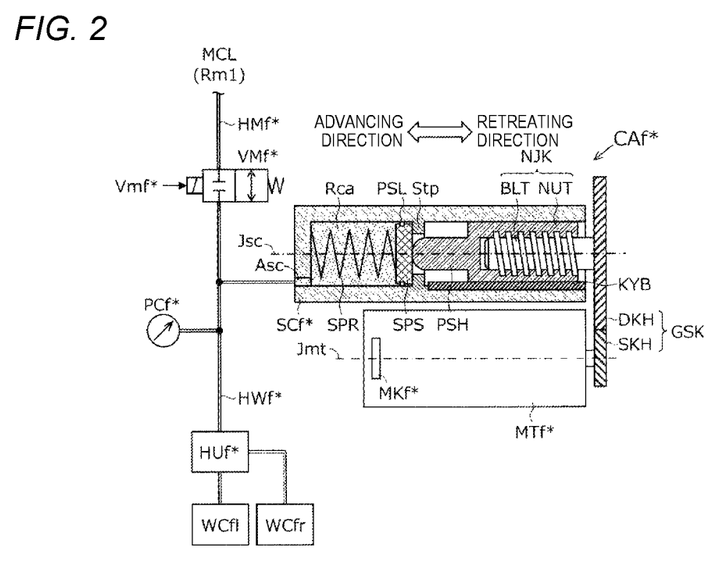
FIG. 2 is a partial cross-sectional view for illustrating a pressure regulating unit.

A description will be made on the pressure regulation unit CAf* for the front wheels (corresponding to the front-wheel actuator) with reference to a partial cross-sectional view in FIG. 2. Because the pressure regulation unit CAr* for the rear wheels (corresponding to the rear-wheel actuator) has the same configuration as the front-wheel pressure regulation unit CAf*, the description thereon will not be made. Note that the additional characters "f*" denoting the pressure regulation unit are replaced with the additional characters "r*", and a description made thereon corresponds to the description of the pressure regulation unit CAr* for the rear wheels.

The front-wheel pressure regulation unit CAf* is connected to the fluid passage (for example, the braking pipe) HWf* between the front-wheel master cylinder shut-off valve VMf* and the wheel cylinders WCf* and is driven by the electric motor MTf*. The pressure regulation unit CAf* is configured to include a reducer GSK, a rotary/linear-driving force conversion mechanism (a screw mechanism) NJK, a pressing member PSH, a control piston SPS, the control cylinder SCf*, and a return spring SPR.

The reducer GSK is configured to include a small-diameter gear SKH and a large-diameter gear DKH. The reducer GSK reduces rotary driving force of the electric motor MTf*, which is then transmitted to the screw mechanism NJK. More specifically, the small-diameter gear SKH is fixed to an output shaft of the electric motor MTf*. The large-diameter gear DKH meshes with the small-diameter gear SKH, and the large-diameter gear DKH is fixed to a bolt member BLT such that a rotational axis of the large-diameter gear DKH matches a rotational axis of the bolt member BLT in the screw mechanism NJK.

The screw mechanism NJK converts rotary driving force of the reducer GSK to linear driving force of the control piston SPS. More specifically, the bolt member BLT of the screw mechanism NJK is coaxially fixed to the large-diameter gear DKH, and a nut member NUT that is screwed to the bolt member BLT moves. The pressing member PSH is fixed to the nut member NUT. When the pressing member PSH presses the control piston SPS, the rotary driving force is converted to the linear driving force (driving force in an advancing direction or a retreating direction) of the control piston SPS. Here, because rotary motion of the nut member NUT is restrained by a key member KYB, the nut member NUT moves in a direction of the rotational axis Jsc of the large-diameter gear DKH (a center axis of the control piston SPS) and presses the control piston SPS.

As the screw mechanism NJK, a "slide screw" such as a trapezoidal screw is adopted. Alternatively, as the screw mechanism NJK, a "rolling screw" such as a ball screw can be adopted.

The control piston SPS is inserted in a cylindrical hole of the control cylinder SCf*, and a combination of the piston and the cylinder is thereby formed. A seal member PSL is provided on an outer circumference of the control piston SPS. This seal member PSL seals a space between the outer circumference (an outer wall) of the control piston SPS and an inner hole (an inner wall) of the control cylinder SCf*. Then, a pressure regulation chamber Rca that is partitioned by the control cylinder SCf* and the control piston SPS is formed.

The pressure regulation chamber Rca in the control cylinder SCf* is connected to the fluid passage (the braking pipe) HWf* via a pressure regulation opening Asc. When the control piston SPS moves (advances or retreats) in the direction of the center axis Jsc (a center axis of the control cylinder inner hole), a volume of the pressure regulation chamber Rca is changed. At this time, the front-wheel master cylinder shut-off valve VMf* is set at the closed position by the drive signal Vmf*. Accordingly, the braking fluid is not transferred in a direction toward the master cylinder MCL (the pressurizing chamber Rm1) but is transferred toward the wheel cylinders WCf*.

When the electric motor MTf* is rotationally driven in a normal rotational direction, the control piston SPS advances in the direction of the center axis Jsc in a manner to decrease the volume of the pressure regulation chamber Rca. Consequently, the braking fluid is pressed out of the control cylinder SCf* toward the wheel cylinders WCf*. Due to this movement of the braking fluid, a pressing force of the friction member MSB against the rotary member KTf* is increased, and the braking torque on each of the wheels WHf* is increased.

On the contrary, when the electric motor MTf* is rotationally driven in a reverse direction, the control piston SPS moves in the retreating direction in a manner to increase the volume of the pressure regulation chamber Rca. Consequently, the braking fluid returns from the wheel cylinders WCf* toward the control cylinder SCf*. Due to this movement of the braking fluid, the pressing force of the friction member MSB against the rotary member KTf* is decreased, and the braking torque on each of the wheels WHf* is decreased.

The control hydraulic pressure sensor PCf* (the front-wheel sensor) is provided to detect the hydraulic pressure Pcf* in the pressure regulation chamber Rca (front-wheel output). The controller ECU receives the actual control hydraulic pressure Pcf* as a detection result of the control hydraulic pressure sensor PCf*. In addition, the hydraulic unit HUf* is provided in the intermediate portion of the wheel cylinder fluid passage HWf*. The hydraulic unit HUf* is configured to include the booster valve and the reduction valve, and independently controls the hydraulic pressures of the front wheel cylinders WCf* when the wheel slip control (the anti-skid control or the like) needs to be executed.

The pressure regulation unit CAf* is provided with the return spring (an elastic body) SPR. When energization of the electric motor MTf* is stopped, the control piston SPS is pressed against a stopper Stp by the return spring SPR. A position where the control piston SPS abuts the stopper Stp is an initial position (a position corresponding to a braking hydraulic pressure being zero).

<Processing in Electronic Control Unit (Controller)>

Figure 3:
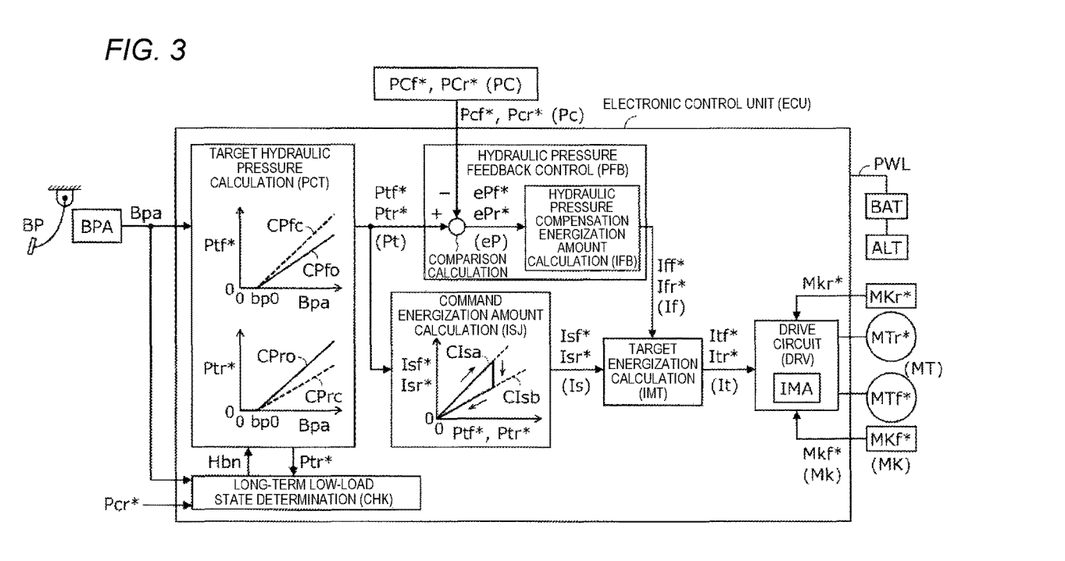
FIG. 3 is a functional block diagram for illustrating processing by an electronic control unit.

A description will be made on processing in the controller (the electronic control unit) ECU with reference to a functional block diagram in FIG. 3. Here, a description will be made on an example in which brushless motors are adopted as the electric motors MTf*, MTr*.

Similar to the descriptions in the other sections, like "MCL" and the like, the members (the components) and the like that are denoted by the same reference signs have the same functions. In addition, the additional characters provided at the end of the reference sign of each of the components indicate the corresponding wheel of the four wheels. The additional characters represent that "fr", "fl", "rr", and "rl" respectively correspond to the "right front wheel", the "left front wheel", the "right rear wheel", and the "left rear wheel". In addition, the additional characters ("f*" and "r*") provided at the end of the various reference signs indicate the relation to the wheels (that is, the front wheels or the rear wheels) in the longitudinal direction of the vehicle. More specifically, "f*" indicates the components and the like related to the front wheels, and "r*" indicates the components and the like related to the rear wheels. Thus, the additional characters "f*" are the collective term of "fr" and "fl", and the additional characters "r*" are the collective term of "rr" and "rl".

On the basis of the operation amount Bpa, the controller ECU controls output of the electric motors MT (the collective term of MTf*, MTr*). The controller ECU is configured to include a target hydraulic pressure calculation block PCT, a long-term low-load state determination block CHK, a command energization amount calculation block ISJ, a hydraulic pressure feedback control block PFB, a target energization amount calculation block IMT, and a drive circuit DRV.

In the target hydraulic pressure calculation block PCT, front-wheel and rear-wheel target hydraulic pressures Ptf*, Ptr* (also simply described as "Pt") are calculated on the basis of the braking operation amount Bpa. Here, the target hydraulic pressure Pt is a target value of the braking hydraulic pressure generated by the pressure regulation unit CA. A result (a rear-wheel distribution ratio) Hbn of the long-term low-load state determination block CHK is reflected to a calculation characteristic (a calculation map) for calculating the target hydraulic pressure Pt.

In the long-term low-load state determination block CHK, the rear-wheel ratio Hbn of braking force distribution is determined on the basis of the braking operation amount Bpa. The braking force distribution is a value that indicates a ratio of the braking force of each axle to the total braking force of all the axles of the vehicle. Accordingly, the rear-wheel distribution ratio Hbn is a ratio of a rear-wheel braking force Fbr* to the total braking force (a sum of a front-wheel braking force Fbf* and the rear-wheel braking force Fbr*) applied to the entire vehicle. For example, it is expressed that "Hbn=Fbr*/(Fbf*+Fbr*)=0.4".

The rear-wheel distribution ratio Hbn can be set such that a value thereof is decreased along with an increase in the front-wheel braking force Fbf*. That is, in the case where the front-wheel braking force Fbf* is set on an X-axis and the rear-wheel braking force Fbr* is set on a Y-axis, a variation characteristic of the rear-wheel distribution ratio Hbn is set as an "upwardly projected" characteristic. This is because, due to the deceleration of the vehicle, a perpendicular force (the load) of each of the front wheels is increased while a perpendicular force of each of the rear wheels is decreased. Accordingly, in the description of the embodiment, in the case where a magnitude relationship of the rear-wheel distribution ratio Hbn is discussed, such a situation where the vehicle is at specified deceleration is stipulated. For example, a situation where the vehicle deceleration is 0.5 G can be adopted. In this case, in the situation where the vehicle is decelerated at 0.5 G by the total braking force, the ratio Hbn is the ratio of the rear-wheel braking force to the total braking force. Thus, a decrease of the rear-wheel distribution ratio Hbn has the same meaning as an increase in a distribution ratio of the front-wheel braking force.

In the long-term low-load state determination block CHK, it is initially determined whether a "long-term low-load state is established" on the basis of the braking operation amount Bpa and the like. Here, the "long-term low-load state" is a thermal load state of the calipers CP and the like where the friction member MSB is continuously pressed against the rear-wheel rotary member KTr* over a long period of time in a state within a specified range sfh (that is, a relatively low load state rather than a load state where the maximum braking force of the wheel is generated). On the basis of the above determination result, the rear-wheel distribution ratio Hbn is determined.

In the case where it is determined that the long-term low-load state is established, the target hydraulic pressure calculation block PCT is instructed to decrease the rear-wheel distribution ratio Hbn in comparison with the case where it is not determined that the long-term low-load state is established. For example, in the case where it is not determined that the long-term low-load state is established, the long-term low-load state determination block CHK outputs a signal that instructs the target hydraulic pressure calculation block PCT to adopt calculation characteristics CPfo, CPro as the rear-wheel distribution ratio Hbn. In the case where it is determined that the long-term low-load state is established, a signal that instructs the target hydraulic pressure calculation block PCT to adopt calculation characteristics CPfc, CPrc as the ratio Hbn is output. Here, the calculation characteristics CPfc, CPrc are characteristics with the decreased rear-wheel distribution ratio Hbn when compared to the calculation characteristics CPfo, CPro.

In the case where the long-term low-load state determination block CHK does not determine that the long-term low-load state is established, in the target hydraulic pressure calculation block PCT, by the calculation characteristics CPfo, CPro of the target hydraulic pressure (characteristics indicated by solid lines), the target hydraulic pressures Pt (the collective term of Ptf* and Ptr*) are calculated to be "0" within a range where the braking operation amount Bpa is equal to or greater than "0 (zero)" (corresponding to the case where the braking operation is not performed) and is less than the specified value bp0. In addition, within a range where the operation amount Bpa is equal to or greater than the specified value bp0, the target hydraulic pressures Pt is calculated to be linearly increased from "0" along with the increase in the operation amount Bpa. Here, the specified value bp0 is a value corresponding to "play" of the brake operating member BP (the play corresponding value).

In the case where the long-term low-load state determination block CHK determines that the long-term low-load state is established, in the target hydraulic pressure calculation block PCT, the front-wheel and rear-wheel target hydraulic pressures Ptf*, Ptr* are determined by the calculation characteristics CPfc, CPrc of the target hydraulic pressure (characteristics indicated by broken lines). Compared to the characteristic CPfo, the higher front-wheel target hydraulic pressure Ptf* is calculated in the characteristic CPfc with respect to the same operation amount Bpa. On the contrary, compared to the characteristic CPro, the lower rear-wheel target hydraulic pressure Ptr* is calculated in the characteristic CPrc with respect to the same operation amount Bpa. Accordingly, in the result (the target hydraulic pressure value) Pt calculated on the basis of each of the characteristics CPfc, CPrc, the rear-wheel distribution ratio Hbn is lower than that in the calculation result Pt based on the characteristics CPfo, CPro. Here, as long as the operation amount Bpa is the same, the total braking force as the vehicle (consequently, the deceleration of the vehicle) is the same regardless of the calculation result Pt based on the characteristics CPfc, CPrc or the calculation result Pt based on the characteristics CPfo, CPro.

Similar to the calculation characteristics CPfo, CPro, in the case of the calculation characteristics CPfc, CPrc, the target hydraulic pressure Pt is calculated to be "0" within the range where the braking operation amount Bpa is equal to or greater than "0 (zero)" and is less than the specified value bp0 (the play corresponding value), and the target hydraulic pressures Pt is calculated to be linearly increased from "0" along with the increase in the operation amount Bpa within the range where the operation amount Bpa is equal to or greater than the specified value bp0.

In the long-term low-load state determination block CHK, it is determined "whether the long-term low-load state is established" on the basis of a detection result Pcr* (corresponding to rear-wheel output) instead of the operation amount Bpa, and the ratio Hbn can thereby be determined. In addition, the determination is made on the basis of the target value Ptr*, and the ratio Hbn can thereby be determined. The target hydraulic pressure Ptr* is calculated on the basis of the operation amount Bpa. Accordingly, in the long-term low-load state determination block CHK, on the basis of the braking operation amount Bpa and/or the output Pcr* (corresponding to the rear-wheel output) of the rear-wheel pressure regulation unit CAr* (corresponding to the rear-wheel actuator), it is determined whether the "long-term low-load state" where a pressing state of the friction member MSB against the rear-wheel rotary members KTr* continues over the long period of time within the specified range sfh is established. The ratio Hbn can be determined on the basis of this determination result.

Note that a relationship between the wheel-cylinder hydraulic pressure and the braking force in the wheel is a one-to-one relationship on the basis of a friction coefficient between the friction member MSB and the rotary member KT, a pressure-receiving area of the wheel cylinder WC, an effective braking radius (a position where the friction member MSB presses the rotary member KT) in a positional relationship between the friction member MSB and the rotary member KT, and a radius of the wheel (a tire). In other words, the wheel-cylinder hydraulic pressure can be converted to the braking force that is generated in the wheel on the basis of specifications of the braking device and the wheel.

In the command energization amount calculation block ISJ, front-wheel and rear-wheel command energization amounts Isf*, Isr* (also simply described as "Is") of the electric motors MT for driving the pressure regulation units CA are calculated on the basis of the target hydraulic pressures Pt (that is, Ptf*, Ptr*) and predetermined calculation characteristics (a calculation map) Clsa, Clsb. The command energization amounts Is are target values of the energization amounts for controlling the electric motors MT. The calculation map for the command energization amounts is configured to include the two characteristics Clsa, Clsb in consideration of an effect of hysteresis by driving force transmission mechanisms (GSK, NJK, and the like).

Here, the "energization amount" is a state amount (a state variable) used to control the output torque of each of the electric motors MT. Because each of the electric motors MT outputs the torque that is substantially proportional to a current, a target current value of each of the electric motors MT can be used as a target value of the energization amount (a target energization amount). In addition, when a supply voltage to each of the electric motors MT is boosted, the current is consequently increased. Thus, a supply voltage value can be used as the target energization amount. Furthermore, the supply voltage value can be regulated by a duty ratio in pulse-width modulation, this duty ratio (proportion of an energization time in a cycle) can be used as the energization amount.

In the hydraulic pressure feedback control block PFB, the target values of the hydraulic pressures (the target hydraulic pressures) Ptf*, Ptr* and detection values of the hydraulic pressures (the actual hydraulic pressures) Pcf*, Pcr* (also simply described as "Pc") of the front wheels and the rear wheels are used as the state variables for control, and, on the basis of these, compensation energization amounts Iff*, Ifr* (also simply described as "If") of the electric motors MTf*, MTr* are calculated. In the case where the control based on the command energization amounts Is is only executed, an error occurs to the hydraulic pressures. Thus, the hydraulic pressure feedback control block PFB compensates for this error. The hydraulic pressure feedback control block PFB is configured to include comparison calculation and a hydraulic pressure compensation energization amount calculation block IPF.

In the comparison calculation, the target value Pt and the detection value Pc of each of the hydraulic pressures are compared. Here, the actual values Pcf* (corresponding to front-wheel output), Pcr* (corresponding to the rear-wheel output) of the hydraulic pressures are the detection values of the hydraulic pressures (the discharged hydraulic pressures) that are respectively acquired (detected) by the control hydraulic pressure sensors PCf* (the front-wheel sensor), PCr* (the rear-wheel sensor). Here, the front-wheel and rear-wheel control hydraulic pressure sensors PCf*, PCr* will also simply be described as "PC". In the comparison calculation, deviations (hydraulic pressure deviations) ePf*, ePr* (also simply described as "eP") between the target hydraulic pressures Pt and the control hydraulic pressures Pc are calculated. The hydraulic pressure compensation energization amount calculation block IPF receives the hydraulic pressure deviations eP (control variables).

The hydraulic pressure compensation energization amount calculation block IPF includes a proportional element block, a derivative element block, and an integral element block and executes so-called PID control. In the proportional element block, each of the hydraulic pressure deviations eP is multiplied by a proportional gain Kp, and a proportional element of each of the hydraulic pressure deviations eP is calculated. In the derivative element block, each of the hydraulic pressure deviations eP is differentiated and then multiplied by a derivative gain Kd, and a derivative element of each of the hydraulic pressure deviations eP is calculated. In the integral element block, each of the hydraulic pressure deviations eP is integrated and then multiplied by an integral gain Ki, and an integral element of each of the hydraulic pressure deviations eP is calculated. Thereafter, the proportional element, the derivative element, and the integral element are added to calculate each of the front-wheel and rear-wheel hydraulic pressure compensation energization amounts Iff*, Ifr* (also simply described as "If"). That is, in the hydraulic pressure compensation energization amount calculation block IPF, feedback control based on the hydraulic pressure is executed on the basis of the comparison results eP between the target hydraulic pressures Pt and the control hydraulic pressures Pc such that the actual control hydraulic pressures (the detection values) Pc match the target hydraulic pressures (the target values) Pt of the hydraulic pressures (that is, the deviations eP approach "0 (zero)").

In the target energization amount calculation block IMT, front-wheel and rear-wheel target energization amounts Itf*, Itr* (also simply described as "It") as final target values of the energization amounts are calculated. Each of the target energization amounts It is calculated on the basis of the command energization amount (the target value) Is and the compensation energization amount (the compensation value) If. More specifically, the compensation energization amount If is added to the command energization amount Is, and a sum thereof is calculated as the target energization amount It (that is, It=Is+If).

In the target energization amount calculation block IMT, a symbol (positivity or negativity of the value) of each of the target energization amounts It (the collective term of Itf*, Itr*) is determined on the basis of a direction in which the electric motor MT should rotate (that is, an increasing/decreasing direction of the hydraulic pressure). In addition, a magnitude of each of the target energization amounts It is calculated on the basis of the rotary driving force that should be output by the electric motor MT (that is, an increasing/decreasing amount of the hydraulic pressure). More specifically, in the case where the braking hydraulic pressure is increased (in the advancing direction of the control piston SPS), the target energization amount It is calculated to have a positive symbol (It>0), and the electric motor MT is driven in the normal rotational direction. On the other hand, in the case where the braking hydraulic pressure is decreased (in the retreating direction of the control piston SPS), the symbol of the target energization amount It is determined as a negative symbol (It<0), and the electric motor MT is driven in the reverse direction. Furthermore, it is controlled that, as an absolute value of the target energization amount It is increased, the output torque (the rotary driving force) of the electric motor MT is increased, and it is also controlled that, as the absolute value of the target energization amount It is decreased, the output torque of the electric motor MT is decreased.

<Three-Phase Brushless Motor and Drive Circuit Thereof (Example of Three-Phase Brushless Motor)>

Figure 4:
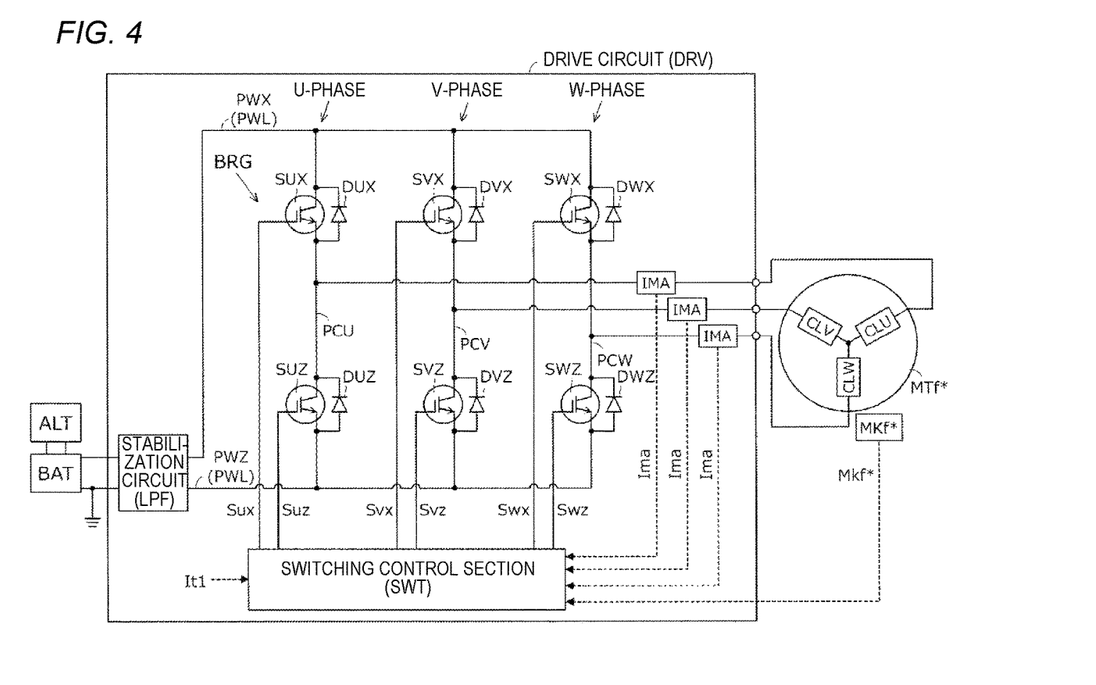
FIG. 4 is a circuit diagram for illustrating an electric motor and a drive circuit thereof.

A description will be made on an example in which a three-phase brushless motor having three coils (windings) of a U-phase coil CLU, a V-phase coil CLV, and a W-phase coil CLW is adopted as the electric motor MT with reference to a circuit diagram in FIG. 4.

The drive circuit DRV is an electric circuit that drives the electric motors MT and corresponds to a part of the controller ECU. The drive circuit DRV is configured to include a switching control section SWT, a three-phase bridge circuit (also simply referred to as a bridge circuit) BRG, and a stabilization circuit LPF. The bridge circuit BRG is formed of six switching elements (power transistors) SUX, SUZ, SVX, SVZ, SWX, SWZ (also described as "SUX to SWZ"). On the basis of drive signals Sux, Suz, Svx, Svz, Swx, Swz (also described as "Sux to Swz") of the phases from the switching control section SWT in the drive circuit DRV, the bridge circuit BRG is driven, and the output of the electric motors MT is regulated.

In the drive circuit DRV, on the basis of the front-wheel and rear-wheel target energization amounts Itf*, Itr*, the drive signals Sux to Swz used for the pulse-width modulation are calculated for the switching elements SUX to SWZ. The front-wheel and rear-wheel electric motors MTf*, MTr* are respectively provided with front-wheel and rear-wheel rotational angle sensors MKf*, MKr* (also simply described as "MK") so as to detect front-wheel and rear-wheel rotational angles Mkf*, Mkr* (also simply described as "Mk").

On the basis of the target energization amounts It and the rotational angles Mk (the collective term of Mkf*, Mkr*), target values Iut, Ivt, Iwt of the energization amounts of the phases (the U-phase, the V-phase, the W-phase) are calculated. On the basis of the target energization amounts Iut, Ivt, Iwt of the phases, the duty ratios (proportion of an ON-time in the cycle) Dut, Dvt, Dwt of pulse width of the phases are determined. On the basis of the duty ratios (target values) Dut, Dvt, Dwt, the drive signals Sux to Swz that are used to determine whether the switching elements SUX to SWZ constituting the bridge circuit BRG are brought into ON-states (energized states) or OFF-states (unenergized states) are calculated. The bridge circuit BRG in the drive circuit DRV is driven by the drive signals Sux to Swz.

The energized states or the unenergized states of the six switching elements SUX to SWZ are separately controlled by the six drive signals Sux to Swz. Here, as the duty ratio is increased, an energization time per unit time is extended in the switching element, and the larger current flows into the coil. As a result, the rotary driving force of the electric motors MT is increased.

In the drive circuit DRV, energization amount acquisition means (for example, a current sensor) IMA is provided for each of the phases to acquire (detect) the actual energization amount (the collective term for each of the phases) Ima. So-called current feedback control is executed such that the detection value (the actual current value) Ima of each of the phases matches corresponding one of the target values Iut, Ivt, Iwt. More specifically, each of the duty ratios Dut, Dvt, Dwt is corrected (slightly regulated) on the basis of a deviation between the actual energization amount Ima and corresponding one of the target energization amounts Iut, Ivt, Iwt. Highly accurate motor control can be achieved by this current feedback control.

The drive circuit DRV is supplied with electric power from a power supply (a battery BAT or a generator ALT). In order to decrease a fluctuation of the supplied electric power (voltage), the drive circuit DRV is provided with the stabilization circuit LPF. The stabilization circuit LPF is configured by a combination of at least one condenser (capacitor) and at least one inductor (coil), and is a so-called LC circuit.

Instead of the brushless motor, a motor with a brush (also simply referred to as a brush motor) can be adopted as each of the electric motors MT. In this case, as the bridge circuit BRG, an H-bridge circuit that is formed of the four switching elements (the power transistors) is used. That is, in the bridge circuit BRG of the brush motor, one of the three phases of the brushless motor is not provided. Similar to the case of the brushless motor, each of the electric motors MT is provided with the rotational angle sensor MK, and the drive circuit DRV is provided with the stabilization circuit LPF. Furthermore, the drive circuit DRV is provided with the energization amount sensor IMA.

<First Processing Example in Long-Term Low-Load State Determination Block>

Figure 5:
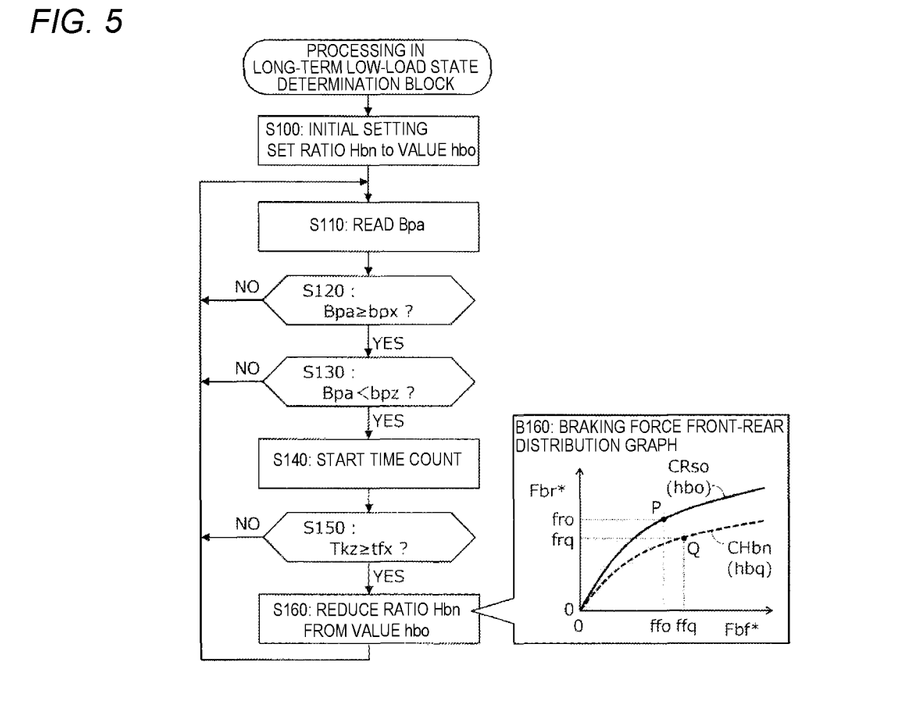
FIG. 5 is a flowchart for illustrating a first processing example in a long-term low-load state.

A description will be made on a first processing example in the long-term low-load state determination block CHK with reference to a flowchart in FIG. 5. Here, the "long-term low-load state" is a state where a situation where the friction members MSB press the rear-wheel rotary members KTr* (a situation within the specified pressing range sfh) continues over a specified long period of time. This braking state is not the load state where the maximum braking force of the wheel is generated. However, because the relatively low braking load state continues over the long period of time, the braking members (CP, MSB, and the like) of the rear wheels are unlikely to be cooled in the long-term low-load state. Thus, the long-term low-load state is one of load conditions that are harsh on the rear-wheel braking members (underbody parts) in terms of heat.

Initially, in step S100, initial setting is performed. In the processing of step S100, the rear-wheel distribution ratio Hbn is set to a predetermined initial value hbo. For example, the initial value hbo can be set as a characteristic that approximates the theoretical braking force distribution CRso (see block B160). The theoretical braking force distribution is the braking force distribution with which the front and rear wheels are simultaneously locked even on road surfaces having different frictional coefficients and the maximum vehicle braking force is generated. In other words, in the theoretical braking force distribution, the braking force is distributed in accordance with dynamic load distribution of each of the wheels (a wheel load in consideration with acceleration applied to a vehicle body). Because the dynamic load distribution is determined in accordance with the vehicle specification, the theoretical braking force distribution can be set in advance on the basis of this specification. For example, the characteristic CRso corresponds to the calculation characteristics CPfo, CPro (see FIG. 3). At this time, a fluctuation of a dynamic load is considered. Thus, the characteristic CPfo is set to have a "downwardly projected" shape, and the characteristic CPro is set to have an "upwardly projected" shape.

Attention is focused on vehicle stability at the time of braking during a turn. The initial value hbo follows the theoretical braking force distribution CRso but can be set as a characteristic having a slight margin for the rear-wheel braking force Fbr*. In regard to a distribution characteristic of this case, the theoretical braking force distribution CRso acquires a shape of being reduced in a direction toward the rear-wheel braking force Fbr* (an intermediate characteristic between the characteristic CRso and a characteristic CHbn).

In step S110, the braking operation amount Bpa is read. Next, in step S120, on the basis of the operation amount Bpa, it is determined "whether the operation amount Bpa is equal to or greater than a low value bpx". Here, the low value bpx is a predetermined specified value (a threshold) used for the determination. If "Bpa≥bpx" and a positive determination is made in step S120 (if "YES"), the processing proceeds to step S130. On the other hand, if "Bpa<bpx" and a negative determination is made in step S120 (if "NO"), the processing returns to step S110.

In step S130, on the basis of the braking operation amount Bpa, it is determined "whether the operation amount Bpa is less than a high value bpz". Here, the high value bpz is a specified value (a threshold) used for the determination and is set in advance as a higher value than the low value bpx. If "Bpa<bpz" and a positive determination is made in step S130 (if "YES"), the processing proceeds to step S140. On the other hand, if "Bpa≥bpz" and a negative determination is made in step S130 (if "NO"), the processing returns to step S110.

If the conditions in steps S120, S130 are satisfied (that is, "bpx≤Bpa<bpz" and in a low-load braking state), in step S140, time starts being counted by timer processing. Here, a time point at which the determination in step S130 is satisfied for the first time (that is, a calculation cycle in which the determination in step S130 is shifted from the negative determination to the positive determination) is set as a start point of time (T=0), and an elapsed period of time Tkz from this start point is determined.

In step S150, it is determined "whether the elapsed period of time Tkz is equal to or longer than a specified period of time tfx". Here, the specified period of time tfx is a predetermined specified value (a threshold) used for the determination. If "Tkz≥tfx" and a positive determination is made in step S150 (if "YES"), the processing proceeds to step S160. On the other hand, if "Tkz<tfx" and a negative determination is made in step S150 (if "NO"), the processing returns to step S110.

If the state of "bpx≤Bpa<bpz" continues over the specified period of time tfx, in step S160, the ratio Hbn is decreased from the initial value hbo and is changed to a lower limit value (a predetermined specified value) hbq. For example, the ratio Hbn is decreased from the initial value hbo to the lower limit value hbq such that the theoretical braking force distribution characteristic CRso is changed to the distribution characteristic CHbn in which the distribution of the rear-wheel braking force is decreased therefrom as illustrated in the block B160. Here, the initial ratio hbo corresponds to the calculation characteristics CPfo, CPro, and the calculation characteristic of the ratio Hbn that has been decreased and changed to the lower limit value hbq corresponds to the characteristics CPfc, CPrc (see FIG. 3).

Before the processing in step S160 is executed, as indicated by the characteristic CRso in the block B160 (a balloon), the front-wheel and rear-wheel braking forces Fbf*, Fbr* are determined at a "point P: hbo=fro/(ffo+fro)". Once the processing in step S160 is executed, as indicated by the characteristic CHbn in the block B160, the front-wheel and rear-wheel braking forces Fbf*, Fbr* is changed to a "point Q: hbq=frq/(ffq+frq)".

Accordingly, when the rear-wheel distribution ratio Hbn is decreased and changed, the front-wheel braking force Fbf* and the rear-wheel braking force Fbr* are relatively regulated. That is, the front-wheel braking force Fbf* is increased from the value ffo to the value ffq, and the rear-wheel braking force Fbr* is decreased from the value fro to the value frq. In this braking force regulation, the braking forces are smoothly increased/decreased so as to prevent the driver from receiving a sense of discomfort (for example, a feeling of discontinuity of the vehicle deceleration).

That the operation amount Bpa falls within a region "bpx to bpz" in the determination in step S120 and the determination in step S130 corresponds to being "within the specified pressing range sfh" in the description of the long-term low-load state. Furthermore, in the determination in step S150, the specified period of time tfx corresponds to the "specified long period of time" in the description of the long-term low-load state. Moreover, the decrease of the rear-wheel distribution ratio Hbn has the same meaning as an increase in the distribution ratio of the front-wheel braking force.

In the long-term low-load state determination block, on the basis of the operation amount Bpa, it is determined whether "the long-term low-load state where the pressing state of the friction member MSB against the rear-wheel rotary members KTr* falls within the specified pressing range sfh and this pressing state continues over the specified period of time" is established. In the case where the long-term low-load state is not determined, the initial value hbo is adopted. That is, in the case where the large braking force is applied in a short period of time during rapid braking from high-speed travel (in a short-term high-load braking state that differs from the long-term low-load braking state), the ratio (the distribution ratio of the rear-wheel braking force) hbo of the rear-wheel braking force Fbr* to the predetermined total braking force (the sum of the braking force Fbf* and the braking force Fbr*) is adopted. For example, as the initial value hbo, the characteristic (the calculation characteristic CRso) that approximates the so-called theoretical braking force distribution can be adopted.

On the contrary, in the case where the long-term low-load state is determined, the initial value hbo is changed, and the ratio Hbn of the rear-wheel braking force Fbr* to the entire braking force of the vehicle is corrected to be decreased. In the relatively mild braking operation over the long period of time (the long-term low-load braking state), relatively high heat capacity is requested for the rear-wheel braking devices (CP, MSB, and the like). Accordingly, in the case where the above long-term low-load situation actually occurs, the rear-wheel braking force is decreased, and the braking force generated by the front-wheel braking members, each of which has room for the heat capacity, is increased. Accordingly, in any of the various braking operations, the heat capacity of each of the front-wheel and rear-wheel braking devices is appropriately regulated by braking force distribution control. Thus, reductions in size and weight of the brake control device as a whole can be achieved.

In addition, in the above short-term high-load braking state, the stability of the vehicle (for example, the vehicle does not deviate in a lateral direction but maintains a straight travel state) is desired. In the short-term high-load braking state, the predetermined distribution ratio (the initial value) hbo of the rear-wheel braking force is always adopted. Thus, the stability of the vehicle can be secured.

Meanwhile, the long-term low-load braking state is likely to occur in a situation where the vehicle slowly travels on a downhill road from a location at high altitudes (that is, the case where the relatively small braking force is continuously generated over the long period of time on the downhill road or the like). In this situation, center of gravity of the vehicle is slightly shifted from the rear wheel side to the front wheel side, and the perpendicular force of each of the rear wheels is decreased. For this reason, the ratio Hbn of the rear-wheel braking force Fbr* to the total braking force (the total sum of the braking forces of the entire vehicle) is decreased from the initial value hbo to the lower limit value hbq. Due to this correction of the distribution (for example, the change from the characteristic CRso to the characteristic CHbn), the rear-wheel braking force Fbr* is relatively decreased while the front-wheel braking force Fbf* is relatively increased. As a result, front-rear distribution of the braking force that corresponds to a fluctuation of an axial load caused by a slope road gradient can be achieved. Furthermore, on a winding road (particularly, at a hairpin curve) on a downhill gradient, it is requested to secure a lateral force of each of the rear wheels. In such a travel state, the ratio Hbn of the rear-wheel braking force is decreased. Thus, a sufficient rear-wheel lateral force is secured, and the stability of the vehicle can be maintained.

In the first processing example of the long-term low-load state determination block CHK that has been described so far, it is determined whether the long-term low-load state is established on the basis of the operation amount Bpa. However, instead of the operation amount Bpa, said determination can be made on the basis of the target hydraulic pressure Ptr* (the target value) and/or the detected hydraulic pressure Pcr* (the actual value). Since the target hydraulic pressure Ptr* is calculated on the basis of the operation amount Bpa, the determination on whether the long-term low-load state is established can be made on the basis of the braking operation amount Bpa and/or the output Pcr* of the rear-wheel actuator CAr*. Similar effects to the above can be exerted even when the target hydraulic pressure Ptr* and/or the actual hydraulic pressure Pcr* is adopted.

<Second Processing Example in Long-Term Low-Load State Determination Block>

Figure 6:
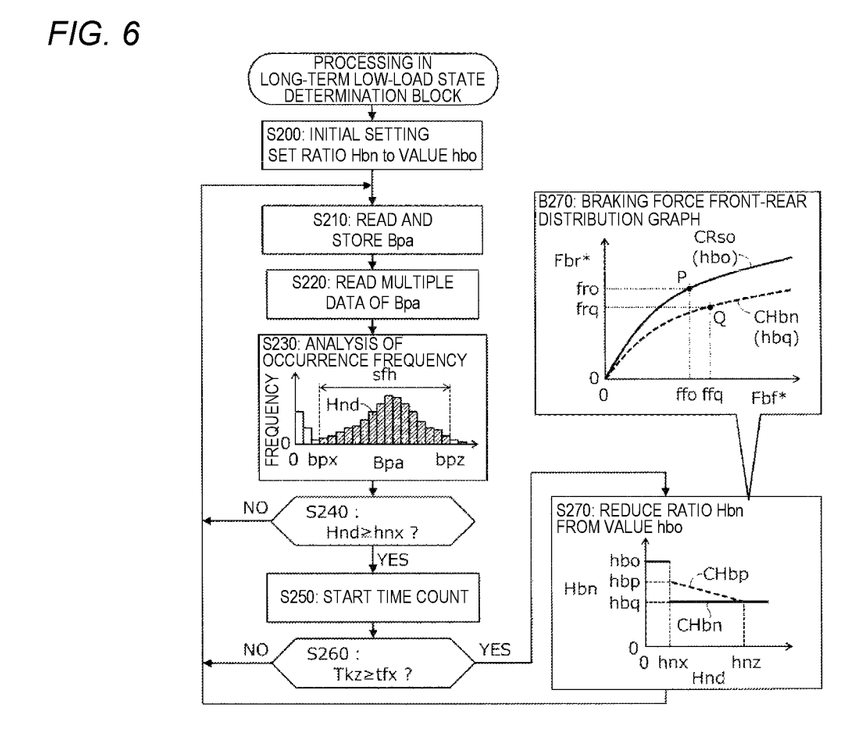
FIG. 6 is a flowchart for illustrating a second processing example in the long-term low-load state.

A description will be made on a second processing example in the long-term low-load state determination block CHK with reference to a flowchart in FIG. 6. In the first processing example, the long-term low-load state is determined on the basis of the magnitude relationship of the operation amount Bpa and the like. In the second processing example, occurrence frequency of the operation amount Bpa and the like is analyzed to determine the long-term low-load state.

Initially, in step S200, the initial setting that is similar to the initial setting in step S100 is performed. That is, the rear-wheel distribution ratio Hbn is set to the predetermined initial ratio hbo. For example, the initial value hbo can be set to the characteristic that approximates the theoretical braking force distribution CRso or to the above intermediate characteristic that follows the theoretical braking force distribution CRso and has room for the rear-wheel braking force.

In step S210, the operation amount Bpa in the current calculation cycle is read and stored. Next, in step S220, the operation amounts Bpa (multiple data sets) that have been stored previously are read. The operation amounts Bpa that are read herein are the data (stored from a time point at which the current braking operation is initiated) in a series of the braking operations.

In step S230, the occurrence frequency of the operation amount Bpa is analyzed on the basis of the multiple time-series operation amounts Bpa. The multiple data sets are classified on the basis of the magnitude of the operation amount Bpa. Then, the number of the repeated occurrence is counted as the occurrence frequency of the operation amount Bpa. More specifically, occurrence frequency (proportion in the entire analytical data sets) Hnd that is indicated by shaded bar graphs and ranges from the specified low value bpx to the specified high value bpz is calculated. Here, the range from the low value bpx to the high value bpz corresponds to the specified pressing range sfh. Accordingly, the occurrence frequency Hnd is the number of the occurrence of the multiple stored operation amounts Bpa within the specified pressing range sfh.

In step S240, on the basis of the analyzed frequency Hnd, it is determined "whether the occurrence frequency Hnd is equal to or higher than specified frequency hnx". Here, the specified frequency hnx is a predetermined specified value (a threshold) used for the determination. If "Hnd hnx" and a positive determination is made in step S240 (if "YES"), the processing proceeds to step S250. On the other hand, if "Hnd<hnx" and a negative determination is made in step S240 (if "NO"), the processing returns to step S210.

Similar to the first processing example, in step S250, the time starts being counted by timer processing. More specifically, a time point at which the determination in step S240 is satisfied for the first time (that is, a calculation cycle in which the determination in step S240 is shifted from the negative determination to the positive determination) is set as the start point of the time (T=0), and the elapsed period of time Tkz from this start point is counted.

In step S260, it is determined "whether the elapsed period of time Tkz is equal to or longer than the specified period of time tfx". Here, the specified period of time tfx (corresponding to the "specified long period of time" in the description of the long-term low-load state) is the predetermined specified value (the threshold) used for the determination. If "Tkz≥tfx" and a positive determination is made in step S260 (if "YES"), the processing proceeds to step S270. On the other hand, if "Tkz<tfx" and a negative determination is made in step S260 (if "NO"), the processing returns to step S210.

If a state where the occurrence frequency Hnd in which "bpx≤Bpa<bpz" is satisfied is equal to or higher than the specified frequency hnx continues over the specified period of time tfx, in step S270, the rear-wheel distribution ratio Hbn is decreased from the initial value hbo and is changed to the lower limit value hbq (<hbo). For example, the rear-wheel distribution ratio Hbn is decreased from the initial value hbo to the smaller value (the predetermined lower limit value) hbq than the initial value hbo such that the theoretical braking force distribution characteristic CRso is changed to the braking force distribution characteristic CHbn in which the rear-wheel distribution is decreased therefrom as illustrated in block B270.

As described by using the block B160 in step S160, as indicated by the block B270 (a balloon) in step S270, the front-wheel braking force Fbf* is smoothly increased from the value ffo to the value ffq, and the rear-wheel braking force Fbr* is smoothly decreased from the value fro to the value frq (transition from a state at a point P to a state at a point Q). That is, the rear-wheel braking force Fbr* is relatively decreased while the front-wheel braking force Fbf* is relatively increased. Here, the initial value hbo corresponds to the calculation characteristics CPfo, CPro, and the calculation characteristic of the ratio Hbn that has been decreased and changed to the lower limit value hbq corresponds to the characteristics CPfc, CPrc (see FIG. 3).

In addition, like the calculation characteristic CHbp indicated by a broken line, it can be determined that the rear-wheel distribution ratio Hbn is decreased as the occurrence frequency Hnd within the specified range sfh is increased. In this case, at a time point at which the occurrence frequency Hnd becomes equal to the specified frequency hnx, the rear-wheel distribution ratio Hbn is rapidly decreased from the initial value hbo to a predetermined specified value (an intermediate value) hbp. Then, up to an upper limit value hnz of the frequency Hnd that is higher than the specified frequency hnx, the rear-wheel distribution ratio Hbn is monotonically decreased from the intermediate value hbp toward the lower limit value hbq along with the increase in the frequency Hnd (see the characteristic CHbp in step S270).

Similar to the first processing example, also in the second processing example, it is determined whether the long-term low-load state is established on the basis of occurrence frequency of the target hydraulic pressure Ptr* (the target value) and/or the actual hydraulic pressure Pcr* (the detection value) instead of the occurrence frequency Hnd of the operation amount Bpa. The target hydraulic pressure Ptr* is calculated on the basis of the operation amount Bpa. Thus, in other words, the determination of the long-term low-load state can be made on the basis of the operation amount Bpa and/or the actual hydraulic pressure Pcr* (the rear-wheel output).

In the second processing example, the similar effects to those in the first processing example are exerted. That is, in the situation of the short-term high-load braking state, the predetermined initial value hbo is adopted. Thus, the stability of the vehicle can be secured. In the situation of the long-term low-load braking state, the long-term low-load state is determined on the basis of the frequency Hnd within the specified pressing range sfh, and the rear-wheel distribution ratio Hbn is decreased. Accordingly, the rear-wheel braking force Fbr* is decreased, the braking force Fbf* that is generated by the front-wheel braking device having the room for the heat capacity is increased, and the heat capacity is thereby appropriately regulated. In addition, the braking force distribution that corresponds to the decrease of the rear-wheel load caused by the gradient of the downhill road can be achieved.

Another Embodiment of Brake Control Device

In the embodiment that has been described with reference to FIG. 1, the hydraulic pressures of the four wheel cylinders WC are controlled by the two pressure regulation units CA that are driven by the electric motors MT. However, what is requested for the brake control device according to the present invention is to allow the change in the braking force distribution among the front and rear wheels of the vehicle.

Accordingly, as the configuration of the brake control device, a configuration that "the hydraulic pressure is generated by the single electric motor, and the braking force of each of the wheels is controlled by the electromagnetic valve" as described in JP-A-2015-71382, a configuration that "the hydraulic pressure stored in the accumulator is regulated by the electromagnetic valve, and the braking force of each of the wheels is thereby controlled" as described in JP-A-2010-13014, a configuration that "the braking force is controlled by an electrically-driven braking actuator that does not use the fluid" as described in JP-A-2014-51197, or the like can be adopted. Even in the case where any of such configurations of the brake control device is adopted, the long-term low-load state is determined, and the ratio Hbn is decreased. In this way, similar effects to the above are exerted. Note that, in the case where the electrically-driven braking actuator that does not use the fluid is adopted, instead of the hydraulic pressure sensor PC, a pressing force sensor that detects a pressing force of the friction member MSB against the rotary member KT is adopted as each of the front-wheel and rear-wheel sensors.

The invention claimed is:

1. A brake control device for a vehicle comprising:
an operation amount sensor that detects an operation amount of a brake operating member of a vehicle;
a front-wheel actuator that presses a friction member against a front-wheel rotary member integrally rotating with a front wheel of the vehicle and thereby generates a front-wheel braking force in said front wheel;
a rear-wheel actuator that presses a friction member against a rear-wheel rotary member integrally rotating with a rear wheel of the vehicle and thereby generates a rear-wheel braking force in said rear wheel;
a front-wheel sensor that detects front-wheel output of the front-wheel actuator;
a rear-wheel sensor that detects rear-wheel output of the rear-wheel actuator; and
a controller that controls the front-wheel actuator and the rear-wheel actuator on the basis of the operation amount, the front-wheel output, and the rear-wheel output, wherein
the controller is configured to
determine whether a long-term low-load state where the friction member is continuously pressed against the rear-wheel rotary member over a long period of time in a state within a specified range is established on the basis of the operation amount and/or the rear-wheel output, and
in the case where it is determined that the long-term low-load state is established, decrease a distribution ratio of the rear-wheel braking force to a total braking force applied to the vehicle in comparison with the case where it is not determined that the long-term low-load state is established.

2. The brake control device for the vehicle according to claim 1, wherein
the controller is configured to
calculate occurrence frequency of the state within the specified range, and
decrease the distribution ratio on the basis of the occurrence frequency.

* * * * *